(12) United States Patent
Ivanov et al.

(10) Patent No.: US 10,789,104 B2
(45) Date of Patent: Sep. 29, 2020

(54) METHODS AND APPARATUS FOR DEPLOYING A DISTRIBUTED SYSTEM USING OPERATING SYSTEM VIRTUALIZATION

(71) Applicant: VMware, Inc., Palo Alto, CA (US)

(72) Inventors: Dimitar Ivanov, Sofia (BG); Miroslav Mitevski, Sofia (BG); Emil Gelev, Sofia (BG); Daniel Pavlov, Sofia (BG); Georgi Mitsov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 103 days.

(21) Appl. No.: 15/638,636

(22) Filed: Jun. 30, 2017

(65) Prior Publication Data
US 2019/0004865 A1    Jan. 3, 2019

(51) Int. Cl.
| | | |
|---|---|---|
| *H04L 29/06* | (2006.01) | |
| *H04L 29/08* | (2006.01) | |
| *G06F 15/173* | (2006.01) | |
| *G06F 9/50* | (2006.01) | |
| *G06F 9/455* | (2018.01) | |
| *H04L 12/24* | (2006.01) | |

(52) U.S. Cl.
CPC ............ *G06F 9/5077* (2013.01); *G06F 9/455* (2013.01); *G06F 9/45558* (2013.01); *G06F 9/5027* (2013.01); *G06F 9/5038* (2013.01); *H04L 41/0813* (2013.01); *H04L 41/0893* (2013.01); *G06F 2009/4557* (2013.01); *G06F 2009/45562* (2013.01); *G06F 2009/45575* (2013.01)

(58) Field of Classification Search
CPC ......... G06F 17/30292; G06F 17/30312; H04L 61/2007

USPC ........ 709/202, 203, 220, 228, 230; 717/107, 717/116, 140; 718/1, 104, 105

See application file for complete search history.

(56) References Cited

U.S. PATENT DOCUMENTS

| | | | |
|---|---|---|---|
| 7,747,698 B2* | 6/2010 | Kovachka-Dimitrova | ................. G06F 8/65 709/207 |
| 10,191,778 B1* | 1/2019 | Yang | ................... G06F 9/45558 |
| 10,360,009 B2* | 7/2019 | Holman | .................... G06F 8/60 |

(Continued)

OTHER PUBLICATIONS

"Containerized Docker Application Lifecycle with Microsoft Platform and Tools"—Cesar de la Torre, Microsoft, Aug. 2016 https://www.microsoft.com/en-us/download/details.aspx?id=54266 (Year: 2016).*

*Primary Examiner* — Randy A Scott

(74) *Attorney, Agent, or Firm* — Hanley, Flight & Zimmerman, LLC

(57) ABSTRACT

Methods and apparatus are disclosed to deploying a distributed system using operating system or container virtualization. An example apparatus includes a management container including a configuration manager and a container manager. The example configuration manager is to receive an instruction for a desired deployment state and is to apply a first change to a first current deployment state of the management container based on the desired deployment state. The example container manager is to apply a second change to a second current deployment state of a deployed container based on the desired deployment state. The container manager is to return information indicative of the desired deployment state to the configuration manager when the second change from the second current deployment state to the desired deployment state is achieved.

20 Claims, 11 Drawing Sheets

(56) References Cited

U.S. PATENT DOCUMENTS

| | | | |
|---|---|---|---|
| 2010/0064299 A1* | 3/2010 | Kacin | G06F 9/45537 |
| | | | 719/317 |
| 2016/0182315 A1* | 6/2016 | Salokanto | H04L 41/5054 |
| | | | 709/226 |
| 2017/0344584 A1* | 11/2017 | Parappalliyalil | H04L 61/2061 |
| 2018/0198824 A1* | 7/2018 | Pulapaka | H04L 63/20 |
| 2018/0288129 A1* | 10/2018 | Joshi | H04L 43/08 |

* cited by examiner

FIG. 3

| UNASSEMBLED PART | CONTAINER ASSESSABLE DESCRIPTION |
| --- | --- |
| | SOURCE (Docker) |
| Build file | Dockerfile |
| Base image reference | Dockerfile or 'docker history <image>' |
| Build arguments | Dockerfile or 'docker inspect <image>' |
| Layer files | Dockerfile 'ADD' instructions or 'docker export <image>' |
| Build environment values | Dockerfile or 'docker inspect <image>' |

FIG. 4

| UNASSEMBLED PART | CONTAINER ASSESSABLE DESCRIPTION |
| --- | --- |
| | SOURCE (Docker) |
| Build file | Dockerfile |
| Base image reference | Dockerfile or 'docker history <image>' |
| Build arguments | Dockerfile or 'docker inspect <image>' |
| Layer files | Dockerfile 'ADD' instructions or 'docker export <image>' |
| Build environment values | Dockerfile or 'docker inspect <image>' |
| Creation arguments | 'docker inspect <image>' |
| Run arguments | '/var/lib/docker/containers/*/{*.json, hosts, *.conf}' |
| Host environment | Host system characteristics |

METHODS AND APPARATUS FOR DEPLOYING A DISTRIBUTED SYSTEM USING OPERATING SYSTEM VIRTUALIZATION

FIELD OF THE DISCLOSURE

This disclosure relates generally to computing system virtualization, and, more particularly, to methods and apparatus for deploying a distributed system using operating system or container virtualization.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

In computing environments, a container is a virtual structure used to run an isolated instance of an application in a host environment. A container virtualizes at the operating system level by abstracting (e.g., isolating) an application from the operating system. For example, an application executing in a container is isolated from an application executing on the host operating system or in other containers.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

FIGS. 3-4 are example container assessable descriptions to assemble containers.

Figure 1:
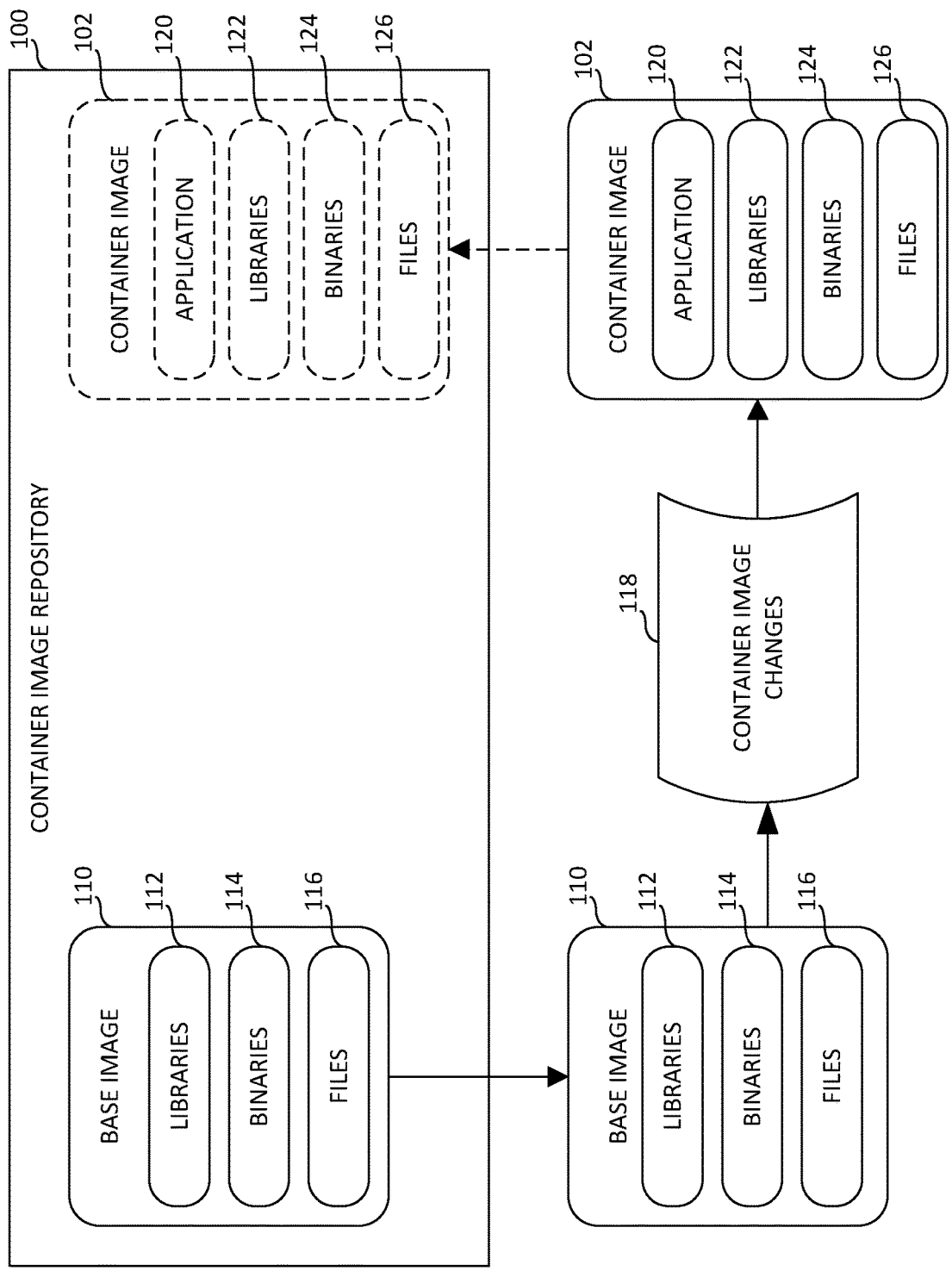
FIG. 1 is an example container image repository from which an example container image may be obtained and/or to which an example container image may be stored and/or published.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Virtualization technologies can be used for computing, storage, and/or networking, for example. Using virtualization, hardware computing resources and/or other physical resources can be replicated in software. One or more application programming interfaces (APIs) can be implemented to provide access to virtualized resources for users, applications, and/or systems while limiting or masking underlying software and/or hardware structure.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

In certain examples, a VM can host a container and/or a container can be implemented for virtualization in place of the VM. Containers (e.g., Docker®, Rocket™, Linux® containers (LXC), etc.) can be used in computing environments to run applications, programs, utilities, and/or any other software in isolation. Containers can be used to achieve improved resource management (e.g., resources used by containerized components are isolated for use only by those components that are part of the same container) and/or for security purposes (e.g., restricting access to containerized files or components). In addition, containers can also be used to achieve lightweight, reproducible application deployment. While a container is intended to run as a well-isolated instance of software in a host environment, the security properties of a container image and/or a container can impact operations of other resources and/or processes in a host computer environment in which the container executes.

Prior to running as a container in the host environment, the container is defined in a container image that specifies components such as an application along with any libraries, binaries and/or other files to execute the container in the host environment (e.g., a VM, etc.). In some examples, the specified components remain unassembled (e.g., they are not located together to form a container) until a time at which the container is to be executed. When a determination is made to execute the container in the host environment, the host environment uses the container image to assemble the previously unassembled parts specified in the container image for execution as a container. In certain examples, a platform as a service (PaaS) environment can host a plurality of containers and virtual applications (vApps).

As disclosed herein, methods and apparatus provide for automation of management tasks such as provisioning multiple virtual machines and/or containers for IaaS and/or other product installation. Virtual appliances, component servers (e.g., Microsoft Windows™ machines, etc.), etc., can be distributed, installed, and managed using virtualization of computing resources including operating system virtualization.

For example, operating system virtualization (also referred to as container virtualization) can facilitate deployment and management of virtual computing resources to provision virtual machines, containers, associated appliances and/or machines, allocate tasks to desired systems to execute those virtual machines or tasks, and/or reclaim cloud computing resources that are no longer in use. The improvements to cloud management systems (e.g., the vCloud Automation Center (vCAC) from VMware®, the vRealize Automation (vRA) Cloud Automation Software from VMware®), interfaces, portals, etc., disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

As described above, many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). In certain examples, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In an example paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Example Container Implementations

In certain examples, containers can be implemented from one or more container images stored in a container image repository. For example, as shown in FIG. 1, a developer can publish and/or store one or more container images 102 in a container image repository 100. The example container image repository 100 can be implemented using a centralized computer architecture or a distributed computer architecture, for example.

The example container image repository 100 serves as a storage facility for container images, such as the example container image 102, and base images, such as an example base image 110. As used herein, "base" is a relative term. For example, a base image is a base relative to another container image that is built upon it. The base image, however, can itself be a container image that can be used to execute a corresponding container. In some examples, the base image 110 can be developed based on another container image serving as a base for the base image 110. In the illustrated example of FIG. 1, the base image 110 serves as an initial framework for the development of another container image, such as the example container image 102. For example, a developer can access the example base image 110 from the container image repository 100 if the developer elects to use the base image 110 as a starting point for developing another container image. The example base image 110 specifies example libraries 112, example binaries 114, and example files 116 that the developer can use and/or modify by, for example, adding one or more executable programs and/or layers of additional libraries, binaries and/or files.

In the illustrated example, the base image 110 can be built onto and/or otherwise modified (e.g., by applying container image changes 118 to the base image 110) to build the example container image 102. The container image 102 of the illustrated example specifies an example application 120, example libraries 122, example binaries 124, and example files 126. For example, the libraries 122, the binaries 124, and the files 126 are used by the example application 120 during an execution phase. After the example container image 102 has been built, the developer can store and/or publish the container image 102 to the example container image repository 100 as shown in FIG. 1. The example container image repository 100 of FIG. 1 can include a number of container images and/or base images, including without limitation a single container image 102. In some examples, the example container image 102 stored in the example container image repository 100 is available to any number of developers who may access the container image 102 from the container image repository 100. In this regard, the example container image 102 is mobile code that can be built upon and/or otherwise modified by any developer and/or other entity having access to the example container image 102.

As discussed above, a base image is an initial framework specifying basic components that a developer may use to develop other container images. In examples disclosed herein, an intermediate container image is an intermediate framework specifying components that have been built upon and/or otherwise modified in relation to the components of a base image. The components of an intermediate container image differ in some respect from those of a final container image. Thus, an intermediate container image is a base relative to a final container image. In examples disclosed herein, a final container image specifies the components that have been built upon and/or otherwise modified in relation to the components of a base image and any intermediate container images from which the final container image was developed. The components of a final container image are to be used to execute a corresponding container in a host environment, for example.

Figure 2:
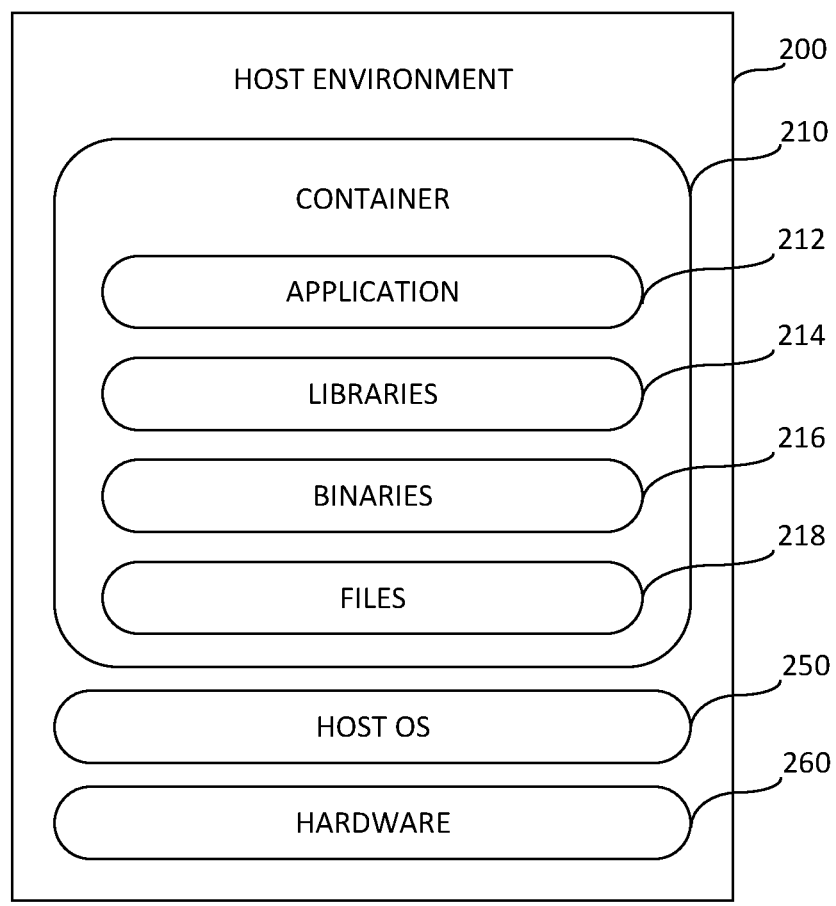
FIG. 2 is an example container running in an example host environment.

FIG. 2 depicts an example container 210 running in an example host environment 200 during an example execution phase. The example host environment 200 can be implemented using, for example, a server, a personal computer, a mobile phone (e.g., a cell phone, a smart phone), a tablet computer, or any other type of computing device. The example container 210 includes an application 212, one or more libraries 214, one or more binaries 216, one or more files 218, etc.

The example host environment 200 includes an example host operating system (OS) 250 and example hardware 260 associated with the host environment 200. The example host OS 250 can be Linux®, Microsoft Windows® or Apple OS X®. In the illustrated example, the hardware 260 includes the example processing platform 1200 of FIG. 12.

In the illustrated example, when an execution decision system receives a request to execute a container in the host environment 200 based on the container image 102, the example container 210 is generated by assembling the previously unassembled parts specified in the example container image 102 of FIG. 1. After generating the container 210, an example execution decision system determines whether the container 210 meets the policy requirements for execution, such as security and/or other isolation/restriction requirements, etc. For example, meeting the policy requirements can be used as an indicator of whether it is safe to execute the container 210.

FIGS. 3-4 provide example container assembly descriptions 300, 400 to be assembled as container(s) 210 in the host environment 200. For example, a container assembler obtains and/or receives the example container image 102 from the container image repository 100 and/or from any other suitable source. One or more unassembled parts specified by the example container image 102 can be identified. As used herein, "unassembled part" refers to any one of the pieces, components, parameters, sections and/or elements that make up, form and/or are referenced by a container image. For example, the container image 102 specifies one or more parts that are to be assembled to form a container for execution. An "unassembled part" refers to a part that is not yet combined or assembled with other parts to make a container. For example, since a container image is a plan or scheme for assembling parts to form a container, parts specified in the container image may remain as "unassembled parts" until time for execution. The unassembled parts specified in the container image 102 may include, for example, a build file, a base image reference, a build argument, a layer file, a build environment value, a creation argument, a run argument, or a host environment value. As used herein, "build file" refers to any file containing instructions that direct how a container system (e.g., Docker®) builds and/or constructs an image (e.g., the example container image 102). As used herein, "base image reference" refers to a reference in a build file to the next image in the stack of images that will ultimately be assembled into a container by a run command. As used herein, "build argument" refers to any argument (e.g., a command line argument) applied by and/or to the container system as it builds and/or constructs an image. As used herein "layer file" refers to any of the contents of files and directories included in an image during image building. As used herein, "build environment value" refers to any parameters (e.g., UNIX® environment values) to the container system as it builds and/or constructs an image. As used herein "run argument" refers to any argument that directs the container system how to assemble and execute a container and identifies the resources to which the container will have access. As used herein, "creation argument" refers to a run argument that assembles a container but does not execute the assembled container. As used herein, "host environment value" refers to any parameters that the container system obtains from the host environment.

After unassembled parts specified in the example container image 102 have been identified, an example container assembly description can be created for the example container image 102. Example container assembly descriptions 300, 400 are illustrated in FIGS. 3-4. Referring to FIG. 3, the example container assessable description 300 includes an identification of the unassembled parts 302 that are specified in the example container image 102. In the illustrated example of FIG. 3, the unassembled parts 302 include an example build file 304, an example base image reference 306, example build arguments 308, example layer files 310 and example build environment values 312. While the example container assessable description 300 includes a specific number and type of unassembled parts 302, the example container assessable description 300 may include any number and/or any type of unassembled parts 302. In the illustrated example, the example container assessable description 300 includes a source identification 320 that identifies a source of each unassembled part 302. With respect to the unassembled parts 302 associated with the container image 102, the source identification 320 for the example build file 304 is "Dockerfile," the source identification 320 for the example base image reference 306 is "Dockerfile or 'docker history <image>,'" the source identification 320 for the example build arguments 308 is "Dockerfile or 'docker inspect <image>,'" the source identification 320 for the example layer files 310 is "Dockerfile 'ADD' instructions or 'docker export <images>,'" and the source identification 320 for the example build environment values 312 is "Dockerfile or 'docker inspect <image>.'"

An alternate example container assessable description 500 that may be created and/or assembled is illustrated in FIG. 4. In the illustrated example of FIG. 4, the container assessable description 400 includes an identification of the unassembled parts 402 identified or detected as being specified in the example container image 102. The example container assessable description 400 of FIG. 4 is similar to the example container assessable description 300 of FIG. 3 described above in that both include the unassembled parts including the example build file 304, the example base image reference 306, example build arguments 308, example layer files 310 and example build environment values 312. The example container assessable description 400 of FIG. 4 differs from the example container assessable description 300 of FIG. 3 described above in that the container assessable description 400 of FIG. 4 includes additional unassembled parts 404 including creation arguments 406, run arguments 408 and host environment values 410. With respect to the unassembled parts 402 of FIG. 4 associated with the container image 102, the source identification 320 for the example creation arguments 406 is "'docker inspect <image>,'" the source identification 320 for the example run arguments 408 is "'/var/lib/docker/containers/*/{*.json, hosts, *.conf}'" and the source identification 320 for the example host environment values 410 is "host system characteristics."

In the illustrated example of FIG. 4, unlike the build file 304, the base image reference 306, the build arguments 308, the layer files 310 and the build environment values 312, which are available from the example container image 102 before an execution phase, the creation arguments 406, run arguments 408 and host environment values 410 are unavailable before the execution phase because a security assessment may be unaware of the runtime characteristics associated with executing a container in the host environment 200 (e.g., the example container 210 executing in the example host environment 200 as shown in FIG. 2). Accordingly, the example container assessable description 400 further identifies the example unassembled parts 402 as example pre-execution phase parts 302 and example execution phase parts 404. As used herein, "pre-execution phase part" refers to an unassembled part of a container image (e.g., the container image 102 and/or base image 110) having one or more properties and/or characteristics that is/are assessable relative to one or more rules of an assessment policy outside of a host environment (e.g., the host environment 200) in which the container image is assembled for execution as a container. As used herein, "execution phase part" refers to an unassembled part of a container image (e.g., the container image 102) having one or more properties and/or characteristics that is/are not assessable relative to one or more rules of the assessment policy outside of a host environment (e.g., the host environment 200) in which the container image is assembled for execution as a container. While the illustrated example of FIG. 4 shows a container assessable description 400 having a specific number of pre-execution phase parts 302 and a specific number of execution phase parts 404, the container assessable description 400 may include any number of pre-execution phase parts 302 and/or execution phase parts 404.

In certain examples, the container 210 can be used to execute code, script code, etc., in a cloud or cloud-like computing environment. The container 210 provides an ability to run certain tasks on request (e.g., on demand)

triggered by a cloud event and/or on an ongoing basis provides flexibility and easier cloud management.

Certain examples include a Representational State Transfer (REST) service(s) that provide a mechanism to submit source code and later trigger execution of that source code in a container 210 on a configured container host 200. Clients of the REST services provide inputs for source code to be executed and later fetch the populated results. On an execution start, a separate container is spawned, code is executed, and results are populated so that the results are available to be consumed via the REST services. The environment setup is prepared via the container images 102. The execution environment can be quite different from the environment in which the code snippet executions are triggered. Leveraging containers 210 (e.g., Docker containers, etc.) provides an isolation level for processing, memory, and storage access. In certain examples, code execution can occur on a different machine from the machine on which the code is called/triggered.

Figure 5:
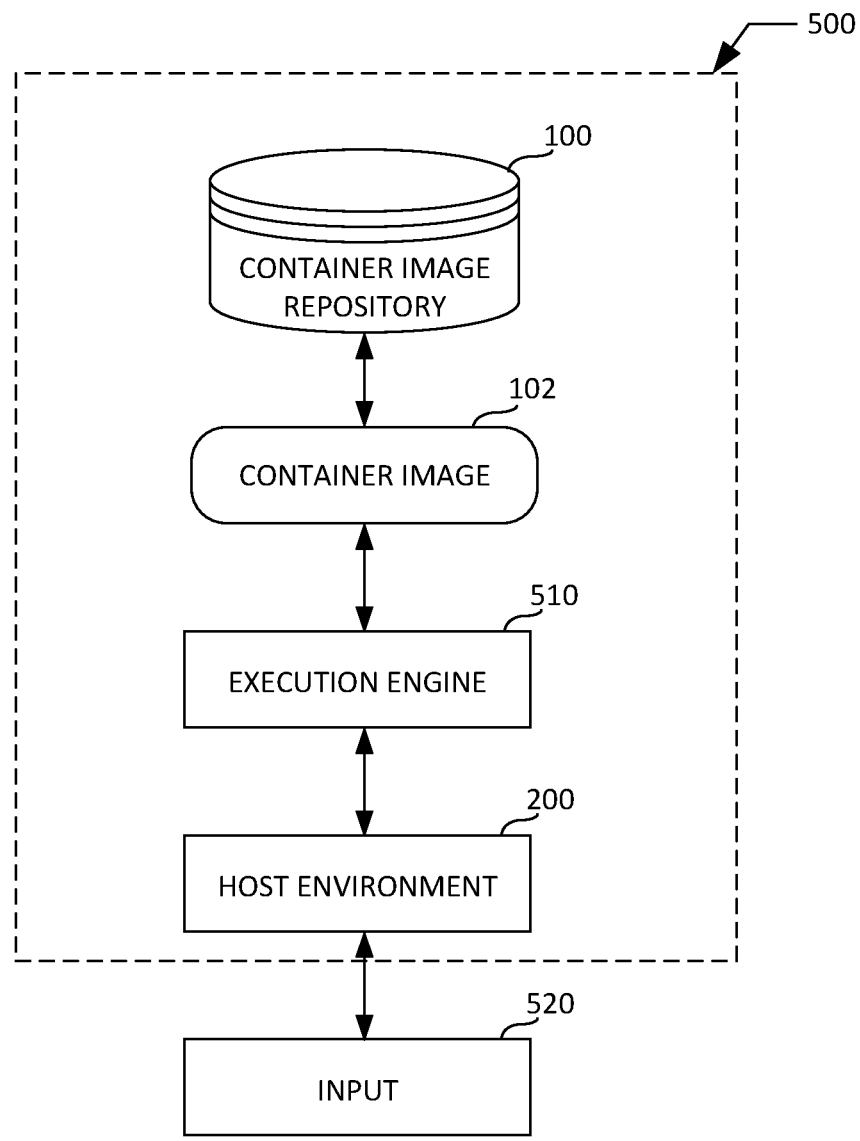
FIG. 5 illustrates an example system to facilitate container spawning for code execution.

FIG. 5 illustrates an example system 500 to facilitate container spawning for code execution. As shown in the example of FIG. 5, the example host environment 200 and/or the example execution engine 510 obtains and/or receives the example container image 102. The container image 102 may be obtained and/or received from any source, including without limitation from the example container image repository 100 described above. In the illustrated example, the previously unassembled parts 302, 404 of the container image 102 can be assembled (e.g., using the execution engine 510, etc.) to execute the container image 102 as a container 210 in the example host environment 200. The container 210 can be provided in the host environment 200 for code execution via an input 520. For example, the input 520 can provide an application programming interface (API) call, such as a REST API call, etc., a user interface input, a stimulus, and/or trigger to execute code in the container 210 in the host environment 200.

In certain examples, code, installation, configuration, execution, etc., can be executed in an isolated, enclosed, detached, or "sandboxed" fashion using containers such as the example container 210. For example, code snippets, scripts, etc., such as Java code, PowerShell™ script, Python code, etc., can be executed via the isolated environment of the container 210 without affecting the rest of the virtual environment. Using containers 210 running on one or more container hosts 200, code can execute without using a dedicated server, for example.

In certain examples, using containers 210, virtual computing resources such as virtual appliances, component servers (e.g., Windows™ machines, Linux™ machines, etc.) can be installed in containers 210 using a container management tool (e.g., Admiral from VMware®, etc.). Using the container management tool simplifies deployment and management of the deployment, offering users easy scalability via the containers 210, for example. Configuration problems can be reduced, minimized, or avoided because the product configuration (e.g., vRA, etc.) is part of the container image 102 generated. Thus, a plurality of products can be deployed via a single container interface technology, which centralizes container deployment, management, etc.

In certain examples, security can also be managed through a single, centralized container management. Containers allow code to execute in a sandbox, and centralized configuration and management of containers allows configuration information to be extracted (and controlled) from a single point, for example.

In certain examples, rather than deploying via a virtual appliance (vA), the container image 102 is deployed to instantiate one or more containers 210 via the container host 200. A container manager manages the container(s) 210 and associated docker host(s) 200, for example. Using the container manager, a variety of containers (e.g., Windows™-based containers, Linux™-based containers, etc.) can be deployed and managed together under a uniform framework facilitated by the container manager. For example, IaaS functionality can be implemented, and IaaS components can be deployed as containerized components.

In operation, an installation is initiated (e.g., by a user, by a computing device, by a software program, etc.), and a container 210 is instantiated to run a configuration service. The configuration service launches a "management" container that is used to configure and managed other containers 210 in deployment. In some examples, the configuration service can be mapped to a vRA installer, which can be run as a process on a user machine and/or as a management container as described above.

Figure 6:
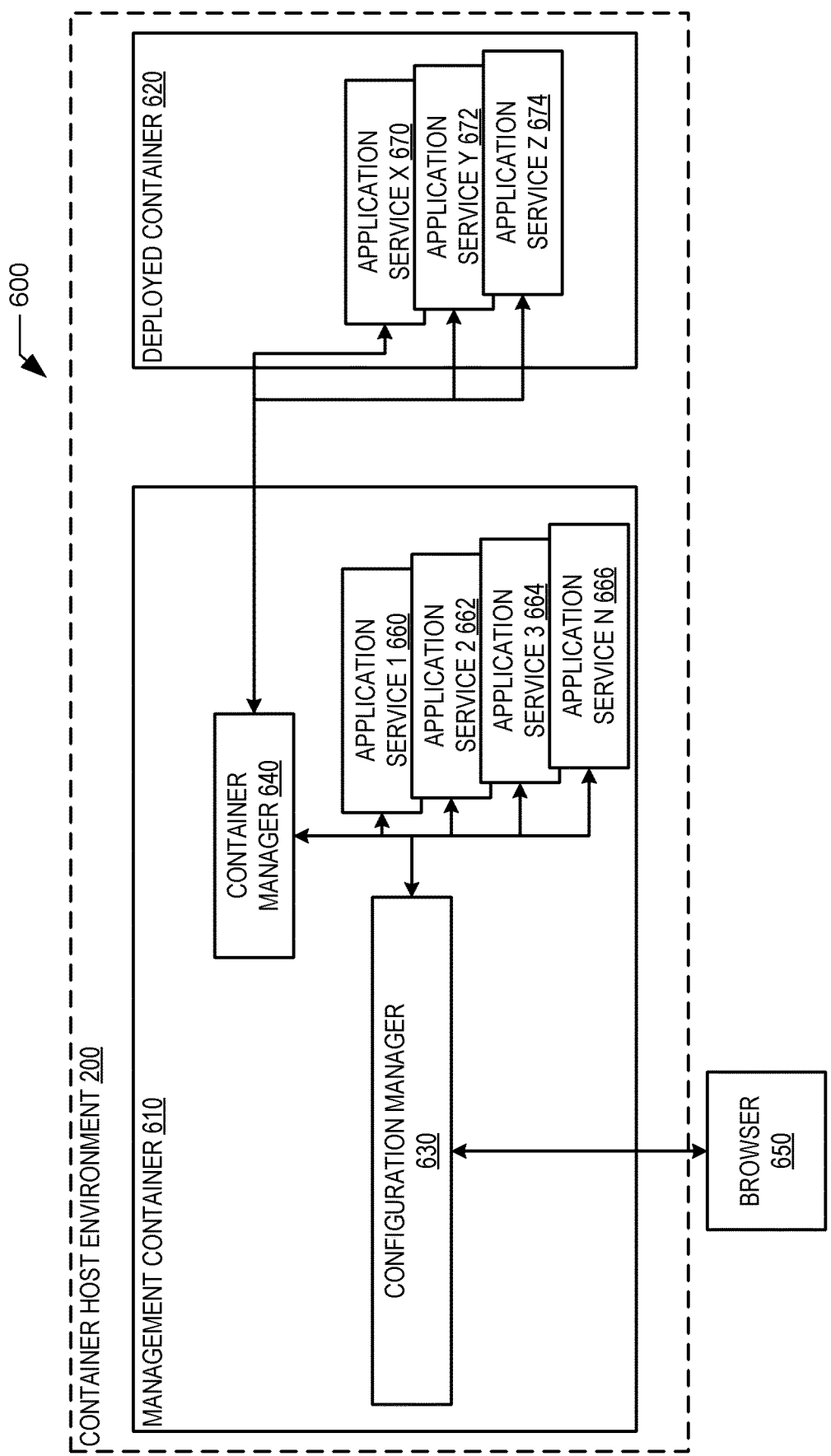
FIGS. 6-7 illustrate an example deployment of a management container and a deployed container in a container host environment.

FIG. 6 illustrates an example deployment 600 of a management container 610 and a deployed container 620 in a container host 200 environment. The example management container 610 includes a configuration manager 630, which controls configuration of containers and services, and a container manager 640, which controls deployment and installation of additional containers 620. The example management container 610 can be a container 210 (e.g., stemming from a container image 102 or a base image 110 from which additional container images 102 can be generated, etc.) and/or a container host 200, for example. The example configuration manager 630 and container manager 640 can be services running on/in the container 610 and/or containers 210 within the management container 610 (e.g., generated from container images 102 associated with a base image 110, etc.), for example. As shown in the example of FIG. 6, the management container 610 can be initiated by a browser 650, which can trigger the installation of one or more machines, such as Windows™ machines, Linux™ machines, etc. The browser 650 activates the configuration manager 630 to configure the management container 610 and/or deployed container 620, for example. In certain examples, the container manager 640 can coordinate and/or help coordinate application services 660-666 and 670-674 at the management container 610 and/or the deployed container 620, for example. In certain examples, the container manager 640 manages containers 610, 620 and associated application services 660-666, 670-674, and the configuration manager 630 can also understand the application services 660-666, 670-674 and the container(s) 610, 620 in which the application services 660-666, 670-674 are running. Application services 660-668 can be services that execute in container(s) 610, 620 and/or run directly on a host machine (e.g., when the management container 610 is container host, etc.).

In certain examples, a plurality of container host environments 200 can be provided. For example, on one container host, a configuration manager container can execute the configuration manager 630, a container manager container can execute the container manager 640, and an application services container executes the services 660-666. A second container host includes an application services container for services 670-674, for example.

Figure 7:
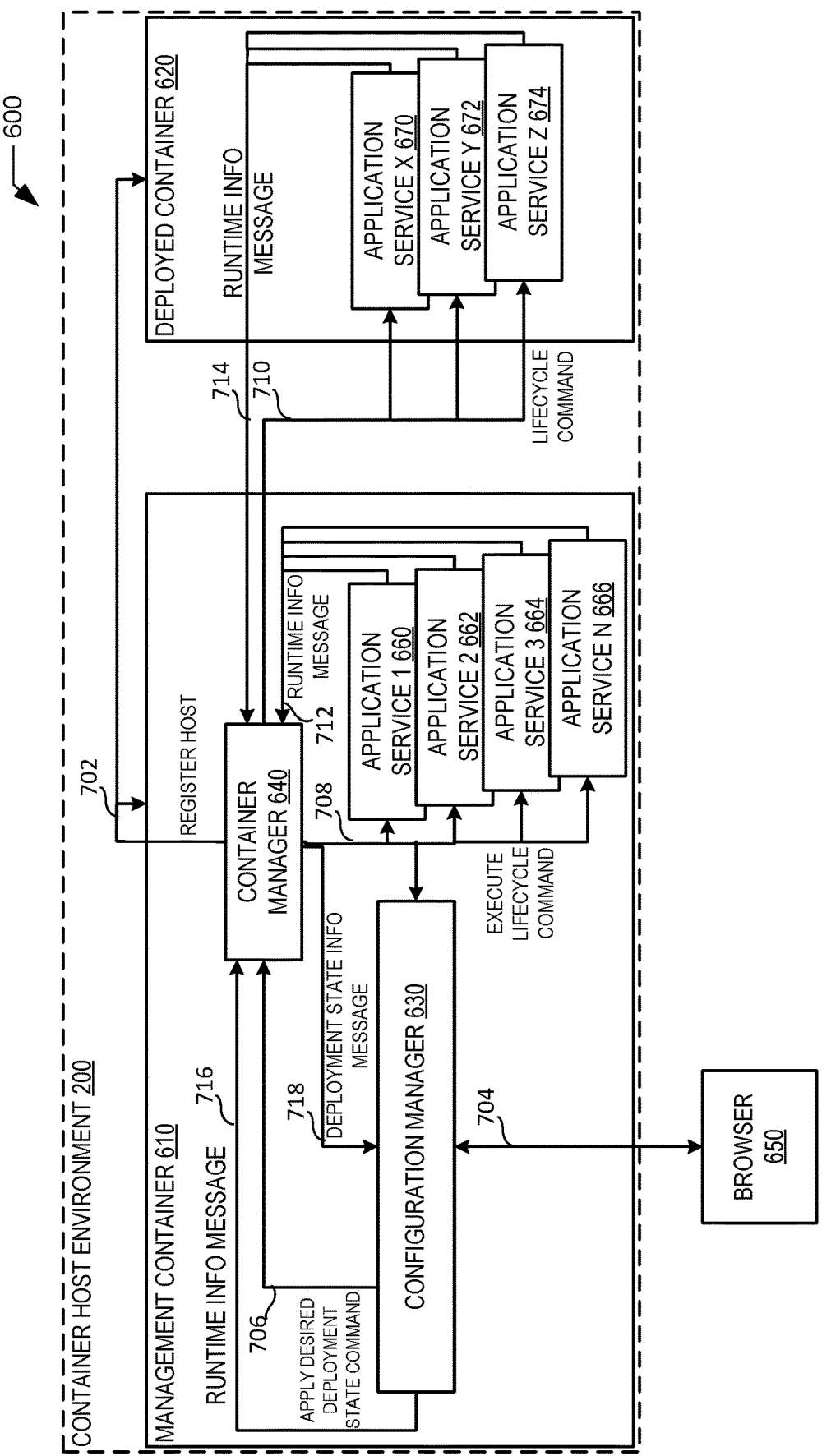

FIG. 7 illustrates an example implementation of the example deployment 600 of FIG. 6. As shown in the example of FIG. 7, the configuration manager 630 (e.g., configuration manager service 630, configuration manager container 630, etc.) provides a system interface accessible via the browser 650, another system/program, etc., to apply a desired state configuration for the deployment 600. A configuration command is sent to the container manager 640 and is applied by executing lifecycle commands with respect to the containers 610, 620. The container manager 640 (e.g., container management service 640, container management container 640, etc.) controls a lifecycle of the containers 610, 620 that form a part of the deployment 600.

Application services 660-666, 670-674 are runtime services that provide functionality as part of the deployment 600. The containers 610, 620 can include one or more than one service 660-666, 670-674. In some examples, application services 660-666, 670-674 may involve a particular operating system for the respective container 610, 620. In some examples, the management container 610 may be a Linux-based container, and the deployed container 620 may be a Windows-based container, for example.

As shown in the example of FIG. 7, the containers 610, 620 are registered 702 with the container host 200 for the deployment 600. A message 704 (e.g., a hypertext transfer protocol (HTTP) message, a secure hypertext transfer protocol (HTTPS) message, Web Sockets, etc.) is sent from the browser 650 to the configuration manager 630 to apply a desired state configuration for deployment. The configuration manager 630 receives the message and generates a command 706 to apply the desired deployment state configuration. The container manager 640 receives the command 706 and implements the deployment state.

The container manager 640 executes and/or triggers execution of lifecycle commands 708, 710 with respect to containers 610, 620 and associated application services 660-666, 670-674 (e.g., over an API provided by the container host 200, 610, 620 such as a Docker API, etc.) according to the deployment state. Lifecycle commands 708, 710 (e.g., create, remove, start, stop, pause, etc.) create, remove, and/or otherwise control containers 610, 620 with a specific runtime environment, for example. The application services 660-666, 670-674 can include database services, authentication services, messaging services, web server services, IaaS services, load balancing, etc., executing within the container 610, 620, for example. The container manager 640 can report runtime information 712, 714 with respect to operation of containers 610, 620. The configuration manager 630 also reports runtime information messages 716 to the container manager 640 during operation. The container manager 640 reports back to the configuration manager 630 with a deployment state information message 718.

In certain examples, application services 660-666, 670-674 can provide service status messages to the configuration manager 630. The configuration manager 630 can provide service configuration commands to the services 660-666, 670-674, for example.

Thus, the management container 610 includes the configuration manager 630 and the container manager 640 (e.g., implemented as containers, sub-containers in a container host, services executing in the management container 610, etc.) which can, based on an instruction, trigger, message 704, etc., facilitate deployment and configuration of one or more additional deployed containers 620 automatically without further external intervention, for example.

Figure 8:
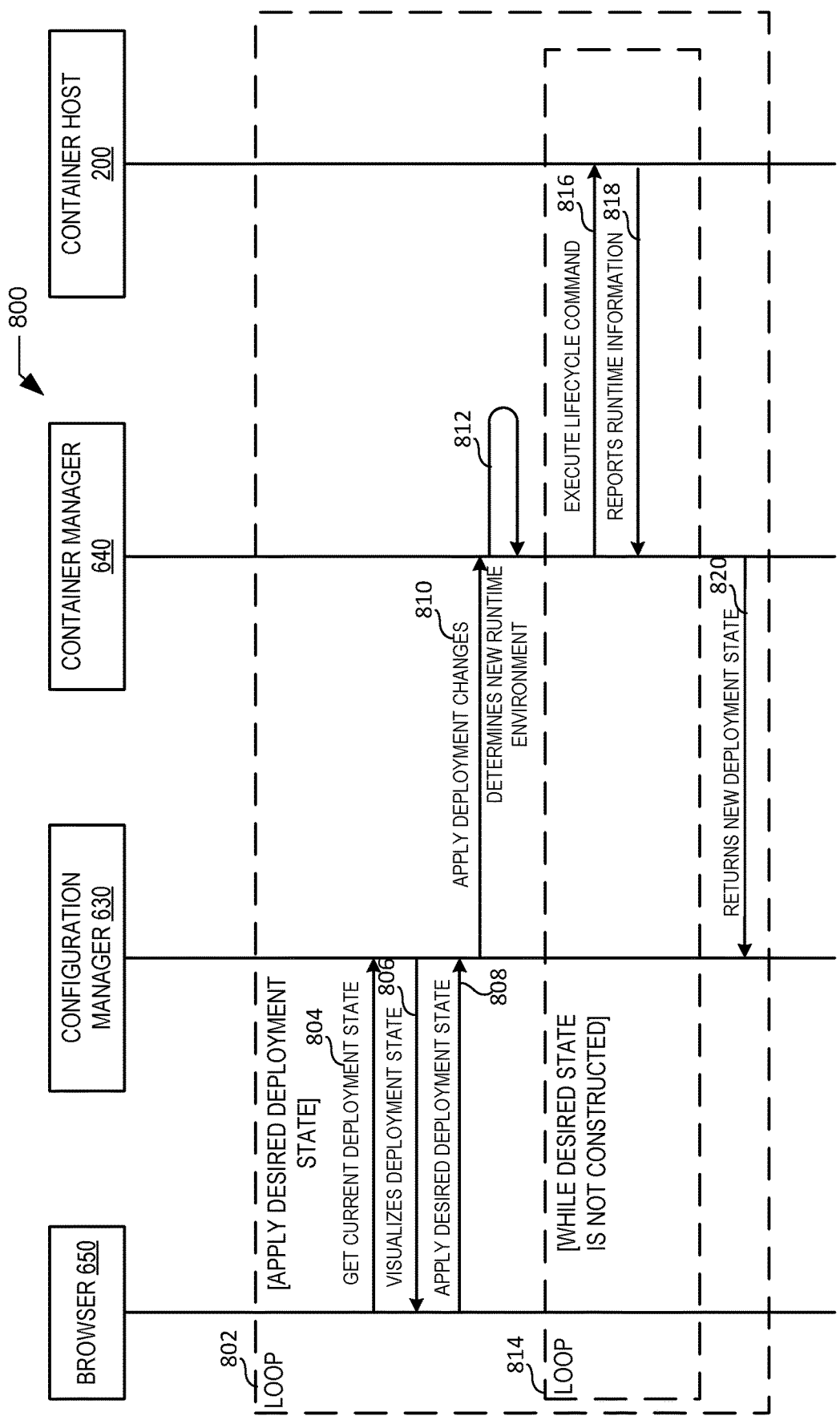
FIG. 8 illustrates a data flow diagram of an example sequence of messages generated and exchange to facilitate container deployment, configuration, and management.

FIG. 8 illustrates a data flow diagram of an example sequence 800 of messages generated and exchange to facilitate container deployment, configuration, and management. A first loop 802 applies a desired deployment state to one or more containers 610, 620. At 804, the browser 650 requests a current deployment state from the configuration manager 630. At 806, the configuration manager 630 provides a visualization of the current deployment state to the browser 650 (e.g., which can display the visualization, route information to another system, etc.). At 808, the browser 650 provides an instruction to apply a desired deployment state to the configuration manager 630.

The desired deployment state message 808 triggers the configuration manager 630 to interact with the container manager 640 to apply the desired deployment state to associated container(s) 610, 620, etc. At 810, the configuration manager 630 applies deployment state changes to the container manager 640. The container manager 640 determines a new runtime environment 812 based on the deployment changes.

A second loop 814 executes until a desired deployment state is no longer configured (e.g., a new instruction or change in operation informs a new deployment state/configuration, etc.). In the second loop 814, the container manager 640 executes or triggers execution of a lifecycle command 816, such as create, remove, start, pause, stop, etc., with respect to the container 620, which includes one or more application services 670. For example, the container host 200 accepts lifecycle commands 816 and executes the commands 816 against existing containers 610 and/or 620 and/or initiate new application services containers when a create lifecycle command is received, etc. At 818, the container manager 640 receives and/or returns a report of runtime information. The container manager 640 executes and/or triggers execution of lifecycle commands 816 and reports runtime information 818 during the lifetime of the container 620 in the deployment. At 820, once the deployment state has been configured, the container manager 640 returns the new deployment state to the configuration manager 630.

While example implementations of the example host 600, containers 610, 620, configuration manager 630, container manager 640, browser 650, application services 660-66, 670-674, and/or more generally, the example systems and sequences are illustrated in FIGS. 1-8, one or more of the elements, processes and/or devices illustrated in FIGS. 1-8 may be combined, divided, re-arranged, omitted, eliminated and/or implemented in any other way. Further, the example host 600, containers 610, 620, configuration manager 630, container manager 640, browser 650, application services 660-66, 670-674, and/or more generally, the example systems and sequences of FIGS. 1-8, may be implemented by hardware, software, firmware and/or any combination of hardware, software and/or firmware. Thus, for example, any of the example host 600, containers 610, 620, configuration manager 630, container manager 640, browser 650, application services 660-66, 670-674, and/or more generally, the example systems and sequences of FIGS. 1-8, can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example host 600, containers 610, 620, configuration manager 630, container manager 640, browser 650, application services 660-66, 670-674, and/or more generally, the example systems and sequences of FIGS. 1-8, is/are hereby expressly defined to include a tangible computer readable storage device or storage disk such as a memory, a digital versatile disk (DVD), a compact disk (CD), a Blu-ray disk, etc. storing the software and/or firmware. Further still, the example systems and/or sequences of FIGS. 1-8 may include one or more elements, processes and/or devices in addition to, or instead of, those illustrated in FIGS. 1-8, and/or may include more than one of any or all of the illustrated elements, processes and devices.

Figure 9:
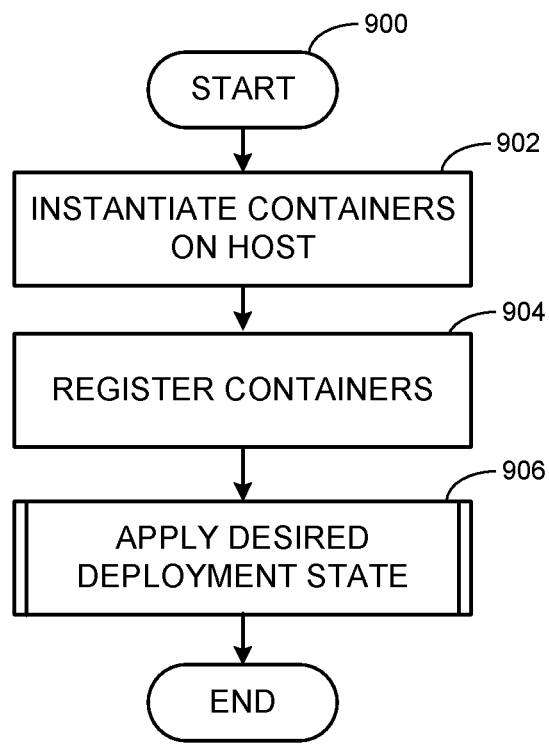
FIGS. 9-11 are flowcharts representative of example machine-readable instructions that may be executed to implement the example systems and sequences of FIGS. 1-8 to facilitate container configuration and management.

A flowchart representative of example machine-readable instructions for implementing sandboxed code execution via containers of FIGS. 1-8 is shown in FIG. 9. In this example, the machine-readable instructions include one or more program(s) for execution by a processor such as the processor 1012 shown in the example processor platform 1000 discussed below in connection with FIG. 10. The one or more program(s) may be embodied in software stored on a tangible computer readable storage medium such as a CD-ROM, a floppy disk, a hard drive, a digital versatile disk (DVD), a Blu-ray disk, or a memory associated with the processor 1012, but the entire program(s) and/or parts thereof could alternatively be executed by a device other than the processor 1012 and/or embodied in firmware or dedicated hardware. Further, although the example program(s) is/are described with reference to the flowchart illustrated in FIG. 9, many other methods of implementing the example systems and sequences of FIGS. 1-8 may alternatively be used. For example, the order of execution of the blocks may be changed, and/or some of the blocks described may be changed, eliminated, or combined.

As mentioned above, the example process(es) of FIG. 9 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) of FIG. 9 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 9 is a flowchart representative of example machine-readable instructions 900 that may be executed to implement the example systems and sequences of FIGS. 1-8 to facilitate container(s) configuration and deployment in a virtualized environment. The example program 900 begins at block 902 when containers 210 are instantiated on a container host 200.

For example, a management container 610 and a deployed container 620 are instantiated on the container host 200. At block 904, the containers 610, 620 are registered. For example, the containers 610, 620 are registered with the host 200, container manager 640, and/or another external control so that the system is aware of the containers 610, 620. The browser 650 can represent the existence of registered container(s) 610, 620 to an end user and/or system, for example.

At block 906, a desired deployment state is applied to the containers 610, 620. For example, a deployment configuration instruction is received from the browser 650 and/or another application includes a deployment state configuration desired for the deployed container 620. The management container 610 receives the deployment configuration instruction (e.g., at the configuration manager 630) and propagates the configuration information to the container manager 640, which facilitates configuration of the containers 610, 620 in a particular deployment state, for example.

Figure 10:
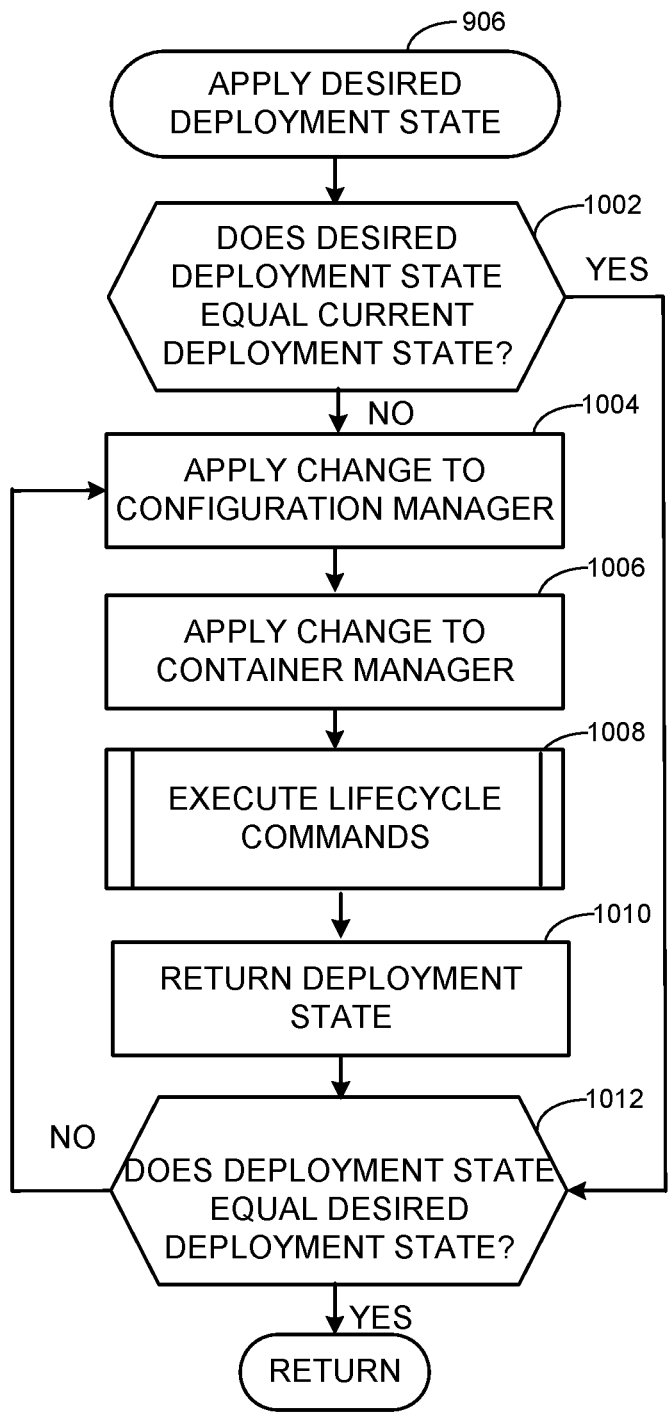

FIG. 10 provides further detail regarding an example implementation of applying the desired deployment state (block 906 of the example of FIG. 9). At block 1002, the desired deployment state is compared to the current deployment state to determine whether the states match (e.g., whether the container 610 already is in the desired deployment state, etc.). If the current state is the desired state, no change is to be done.

However, if the current state is not the desired deployment state, then, at block 1004, a change is applied to the configuration manager 630. For example, one or more parameters, settings, virtualizations, etc., associated with the desired deployment states can be applied to the configuration manager 630 of the management container 610.

At block 1006, a change is applied to the container manager 640. For example, one or more parameters, settings, virtualizations, etc., associated with the desired deployment states can be applied to the container manager 640 of the management container 610.

At block 1008, the container manager 640 executes and/or triggers execution of one or more lifecycle commands with respect to container(s) 610, 620. For example, lifecycle commands create or remove containers 610, 620 with a particular runtime environment, and the container manager 640 receives and/or reports associated runtime information while operating during the lifetime of container(s) 610, 620.

At block 1010, the deployment state is returned (e.g., to the configuration manager 630, the browser 650, etc.). At block 1012, the current deployment state is compared to the desired deployment state. If the states match, then the configuration is complete, and the sequence returns. If the states do not match, then the process loops or repeats at block 1004 until the states matched (e.g., until the desired deployment state is reached).

Figure 11:
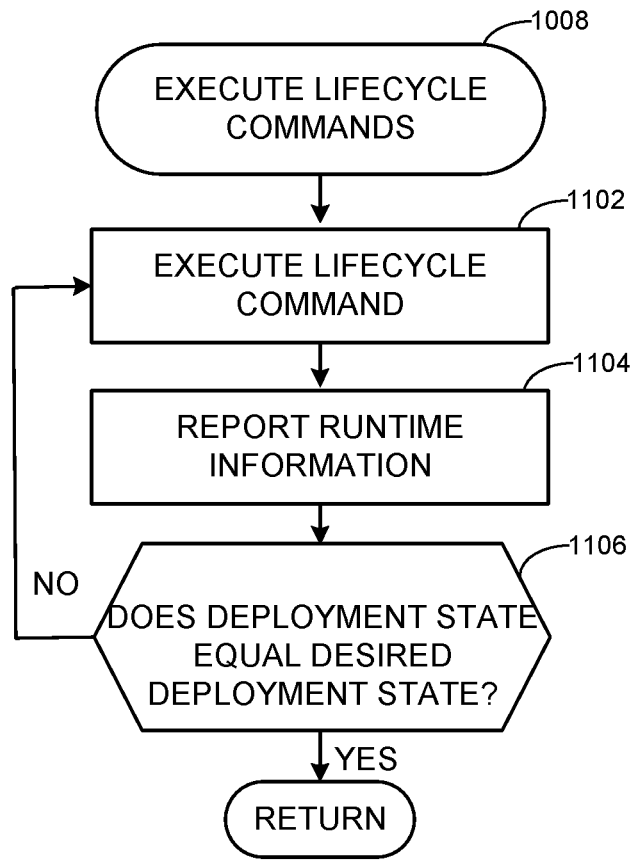

FIG. 11 provides further detail regarding an example implementation of executing lifecycle commands via the container manager 640 (block 1008 of the example of FIG. 10). At block 1102, a lifecycle command is executed via the container host environment 200. For example, a container 610, 620 can be created, removed, configured, etc., using lifecycle command(s) executed and/or triggered for execution by the container manager 640. For example, the browser 650 can be used to trigger a lifecycle command via the container manager 640 to the configuration manager 630 and the host environment 200. At block 1104, runtime information is reported. For example, status information (e.g., container 610, 620 status information, host environment 200 status information, etc.), command result information, etc., can be reported. At block 1106, the current deployment state is compared to the desired deployment state. If the states match, the process returns. If the states do not yet match, configuration of the desired deployment state is not yet complete, and the process repeats at block 1102.

Figure 12:
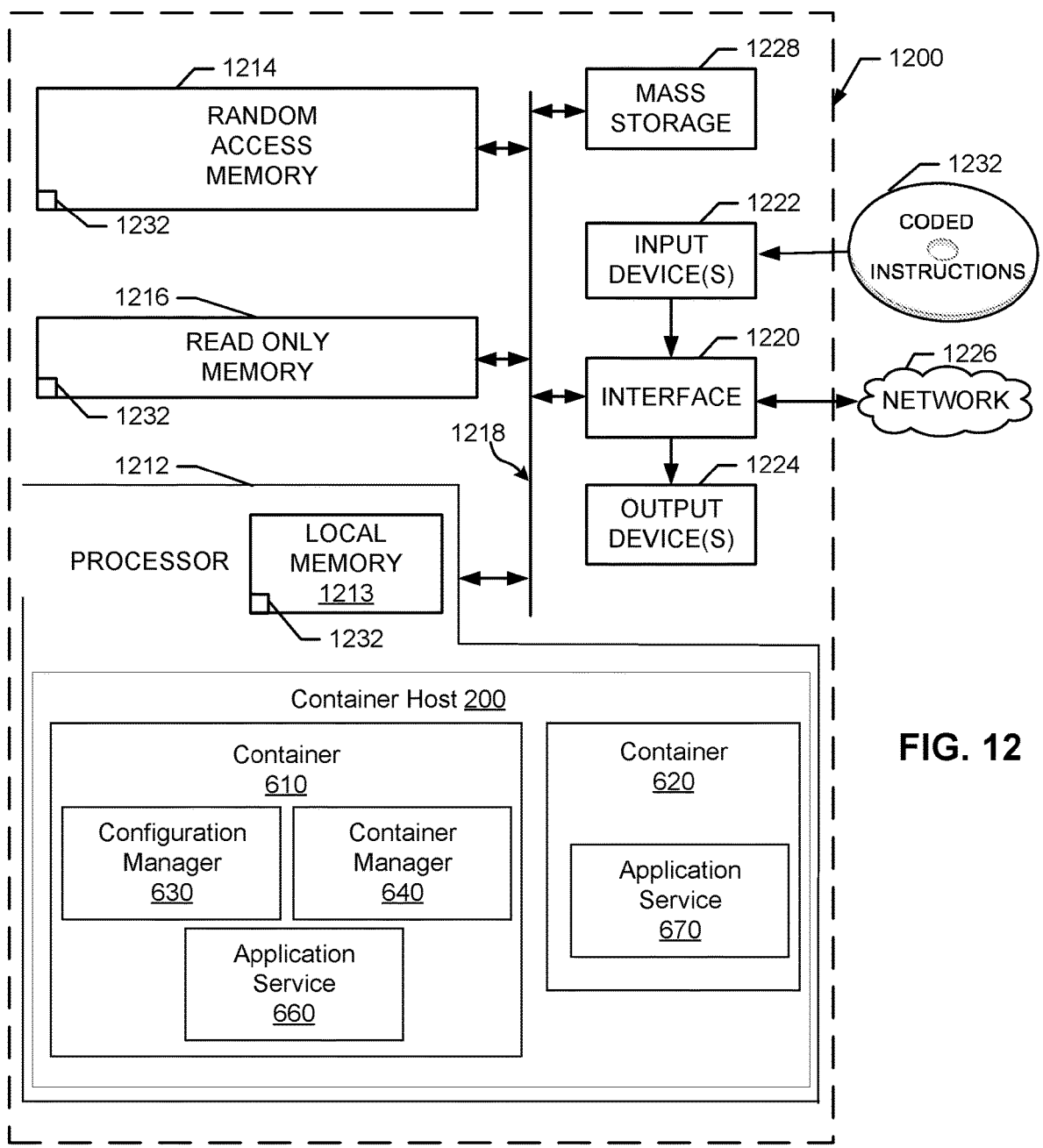
FIG. 12 is a block diagram of an example processing platform capable of executing the example instructions of FIGS. 9-11 to implement the example systems and associated sequences of FIGS. 1-8.

FIG. 12 is a block diagram of an example processor platform 1200 capable of executing the instructions of FIGS. 9-11 to implement the example systems and associated sequences of FIGS. 1-8. The processor platform 1200 can be, for example, a server, a personal computer, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes the example container host 200, container 610, 620, configuration manager 630, container manager 640, browser 650, and/or application services 660-666 and/or 670-674 described above in connection with FIGS. 1-8. The example processor 1212 also includes a local memory 1214 (e.g., a cache). The processor 1212 of the illustrated example is in communication with a main memory including a volatile memory 1216 and a non-volatile memory 1218 via a bus 1220. The volatile memory 1216 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1218 may be implemented by flash memory and/or any other desired type of memory device. Access to the main memory 1216, 1218 is controlled by a memory controller.

The processor platform 1200 of the illustrated example also includes an interface circuit 1222. The interface circuit 1222 may be implemented by any type of interface standard, such as an Ethernet interface, a universal serial bus (USB), and/or a PCI express interface.

In the illustrated example, one or more input devices 1224 are connected to the interface circuit 1222. The input device(s) 1224 permit(s) a user to enter data and commands into the processor 1212. The input device(s) can be implemented by, for example, a keyboard, a mouse, a touchscreen, a track-pad, a trackball, isopoint and/or a voice recognition system.

One or more output devices 1226 are also connected to the interface circuit 1222 of the illustrated example. The output devices 1226 can be implemented, for example, by display devices (e.g., a liquid crystal display, a cathode ray tube display (CRT), a touchscreen, a printer and/or speakers). The interface circuit 1222 of the illustrated example, thus, typically includes a graphics driver card, a graphics driver chip or a graphics driver processor.

The interface circuit 1222 of the illustrated example also includes a communication device such as a transmitter, a receiver, a transceiver, a modem and/or network interface card to facilitate exchange of data with external machines (e.g., computing devices of any kind) via a network 1228 (e.g., an Ethernet connection, a digital subscriber line (DSL), a telephone line, coaxial cable, a cellular telephone system, etc.).

The processor platform 1200 of the illustrated example also includes one or more mass storage devices 1230 for storing software and/or data. Examples of such mass storage devices 1230 include floppy disk drives, hard drive disks, compact disk drives, Blu-ray disk drives, RAID systems, and digital versatile disk (DVD) drives.

The coded instructions 1200 of FIGS. 9-11 may be stored in the mass storage device 1230, in the volatile memory 1216, in the non-volatile memory 1218, and/or on a removable tangible computer readable storage medium 1232 such as a CD or DVD.

Thus, certain examples provide improved, automated generation and deployment of containers 610, 620 and implementation of a deployment state on those containers 610, 620. Certain examples provide a management container 610 to automatically facilitate the generation of one or more deployed containers 620. Certain examples provide a configuration manager 630 in the management container 610 to facilitate configuration according to the desired deployment state. Certain examples provide a container manager 640 to propagate changes for the desired deployment state to the deployed container 620.

Certain examples facilitate ease in scaling, deployment, and configuration automatically in response to an instruction or trigger. Certain examples form a configuration as part of a container image to be installed and propagated without manual user input. Certain examples provide a "special" management container to manage deployment, operation, and discard of additional containers dynamically and automatically according to a desired deployment state and/or other instruction, for example. Certain examples virtualize other containers via the management container. Certain examples facilitate implementation and deployment of IaaS components via containers according to a configuration manager and a container manager coordinating application services.

Certain examples provide an apparatus including a processor and a memory to implement at least a management container including a configuration manager and a container manager. The example configuration manager is to receive an instruction for a desired deployment state and is to apply a first change to a first current deployment state of the management container based on the desired deployment state. The example container manager is to apply a second change to a second current deployment state of a deployed container based on the desired deployment state. The example container manager is to return information indicative of the desired deployment state to the configuration manager when the second change from the second current deployment state to the desired deployment state is achieved.

Certain examples provide a computer readable storage medium including instructions which, when executed, cause a processor to instantiate an apparatus in a virtualized environment. The example apparatus includes a management container including a configuration manager and a container manager. The example configuration manager is to receive an instruction for a desired deployment state and to apply a first change to a first current deployment state of the management container based on the desired deployment state. The example container manager is to apply a second change to a second current deployment state of a deployed container based on the desired deployment state. The example container manager is to return information indicative of the desired deployment state to the configuration manager when the second change from the second current deployment state to the desired deployment state is achieved.

Certain examples provide a method including receiving, at a management container, an instruction for a desired deployment state. The example method includes applying, using a configuration manager of the management container, a first change to a first current deployment state of the management container based on the desired deployment state. The example method includes applying, using a container manager of the management container, a second change to a second current deployment state of a deployed container based on the desired deployment state. The example method includes returning, using the container manager, information indicative of the desired deployment state to the configuration manager when the second change from the second current deployment state to the desired deployment state is achieved.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a processor and a memory to implement at least:
   a management container including a configuration manager and a container manager, the management container instantiated in a container host environment to manage a deployed container in the container host environment, the management container and the deployed container to execute application services in the container host environment,
   the configuration manager to receive an instruction for a desired deployment state and to apply a first change to a first current deployment state of the management container based on the desired deployment state, the desired deployment state including a configuration for the management container and the deployed container in the container host environment to execute the application services, and
   the container manager to apply a second change to a second current deployment state of the deployed container based on the desired deployment state, the container manager to return confirmation of the desired deployment state to the configuration manager when the second change matches the second current deployment state to the desired deployment state.

2. The apparatus of claim 1, wherein the configuration manager is to determine a runtime environment based on applying the first change.

3. The apparatus of claim 2, wherein the container manager is to execute a lifecycle command with respect to the deployed container based on the runtime environment.

4. The apparatus of claim 3, wherein the container manager is to report runtime information during a lifecycle of the deployed container.

5. The apparatus of claim 1, wherein the configuration manager and the container manager are to be implemented as at least one of containers or services running in the management container.

6. The apparatus of claim 1, wherein the instruction for the desired deployment state is triggered by a browser.

7. The apparatus of claim 1, wherein the instruction is to originate from outside the container host environment.

8. The apparatus of claim 1, wherein the instruction is to trigger the configuration manager to apply the first change to the first current deployment state to match the desired deployment state, and wherein the configuration manager is to trigger the container manager to apply the second change to the second current deployment state of the deployed container to match the desired deployment state.

9. A tangible computer readable storage medium including instructions which, when executed, cause a processor to instantiate an apparatus in a virtualized environment, the apparatus comprising:
   a management container including a configuration manager and a container manager, the management container instantiated in a container host environment to manage a deployed container in the container host environment, the management container and the deployed container to execute application services in the container host environment,
   the configuration manager to receive an instruction for a desired deployment state and to apply a first change to a first current deployment state of the management container based on the desired deployment state, the desired deployment state including a configuration for the management container and the deployed container in the container host environment to execute the application services, and
   the container manager to apply a second change to a second current deployment state of the deployed container based on the desired deployment state, the container manager to return confirmation of the desired deployment state to the configuration manager when the second change matches the second current deployment state to the desired deployment state.

10. The computer readable storage medium of claim 9, wherein the configuration manager is to determine a runtime environment based on applying the first change.

11. The computer readable storage medium of claim 10, wherein the container manager is to execute a lifecycle command with respect to the deployed container based on the runtime environment.

12. The computer readable storage medium of claim 11, wherein the container manager is to report runtime information during a lifecycle of the deployed container.

13. The computer readable storage medium of claim 9, wherein the configuration manager and the container manager are to be implemented as at least one of containers or services running in the management container.

14. The computer readable storage medium of claim 9, wherein the instruction for the desired deployment state is triggered by a browser.

15. A method comprising:
   receiving, at a management container, an instruction for a desired deployment state, the management container instantiated in a container host environment to manage a deployed container in the container host environment, the management container and the deployed container to execute application services in the container host environment;
   applying, using a configuration manager of the management container, a first change to a first current deployment state of the management container based on the desired deployment state, the desired deployment state including a configuration for the management container and the deployed container in the container host environment to execute the application services;
   applying, using a container manager of the management container, a second change to a second current deployment state of the deployed container based on the desired deployment state; and
   returning, using the container manager, confirmation of the desired deployment state to the configuration manager when the second change matches the second current deployment state to the desired deployment state.

16. The method of claim 15, further including determining, using the configuration manager, a runtime environment based on applying the first change.

17. The method of claim 16, further including triggering execution of a lifecycle command based on the runtime environment.

18. The method of claim 17, further including reporting runtime information to the container manager.

19. The method of claim 17, wherein the configuration manager and the container manager are to be implemented as at least one of containers or services running in the management container.

20. The method of claim 15, wherein the instruction for the desired deployment state is triggered by a browser.

* * * * *